United States Patent

Wang et al.

[11] Patent Number: 5,938,268
[45] Date of Patent: Aug. 17, 1999

[54] SUN VISOR FOR AUTOMOBILES

[76] Inventors: Chia-Hung Wang; Chia-Zheng Wang, both of P.O. Box 82-144, Taipei, Taiwan

[21] Appl. No.: 09/049,905

[22] Filed: Mar. 30, 1998

[51] Int. Cl.⁶ ........................................................ B60J 3/02
[52] U.S. Cl. ............................................................ 296/97.2
[58] Field of Search ............................................. 296/97.2

[56] References Cited

U.S. PATENT DOCUMENTS

| | | | |
|---|---|---|---|
| 2,311,840 | 2/1943 | Land | 296/97.2 |
| 2,526,889 | 10/1950 | McComb | 296/97.2 |
| 2,856,810 | 10/1958 | Frost | 296/97.2 |
| 2,915,936 | 12/1959 | Winchell | 296/97.2 |
| 2,915,937 | 12/1959 | Winchell | 296/97.2 |

*Primary Examiner*—Gary C. Hoge
*Attorney, Agent, or Firm*—A & J

[57] ABSTRACT

A sun visor for-automobiles includes a frame having a first circular opening and a second circular opening concentric with the first circular opening, a first lens fixedly mounted in the first circular opening, an adjust wheel rotatably fitted within the second circular opening, a second lens fixedly mounted in the adjust wheel, and control means for driving the adjusting wheel, whereby the amount of light transmitted through the sunshield can be adjusted as desired.

3 Claims, 7 Drawing Sheets

SUN VISOR FOR AUTOMOBILES

BACKGROUND OF THE INVENTION

1. Field of the Invention

This invention is related to a sun visor for automobiles and in particular to one which can adjust the amount of light transmitted therethrough.

2. Description of the Prior Art

It has been found that the conventional sun visor used in automobiles includes a base body, a decorative element with which the base body is covered, and a pivot rod mechanism for holding the visor in the stored position or to allow the visor to be set at the position which provides the preferred shade for the driver's passenger's eyes. However, such a sun visor cannot protect the eyes of the driver and of the front seat passenger from direct sunlight. Hence, numerous sun visors have been developed to obviate this drawback, but none of them is satisfactory in use.

Therefore, it is an object of the present invention to provide a sun visor for automobiles which can obviate and mitigate the above-noted drawbacks.

SUMMARY OF THE INVENTION

This invention is related to an improved sun visor for automobiles which can adjust the light transmitted therethrough as desired.

According to one aspect of the present invention, the sun visor for automobiles includes a frame having a first circular opening and a second circular opening concentric with the first circular opening, a first lens fixedly mounted in the first circular opening, an adjusting wheel rotatably fitted within the second circular opening, a second lens fixedly mounted in the adjusting wheel, and means for driving the adjusting wheel.

According to another aspect of the present invention, the first circular opening is formed with a circumferential groove dimensioned to receive the first lens and the second circular opening is formed with a circumferential groove dimensioned to receive the second lens.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
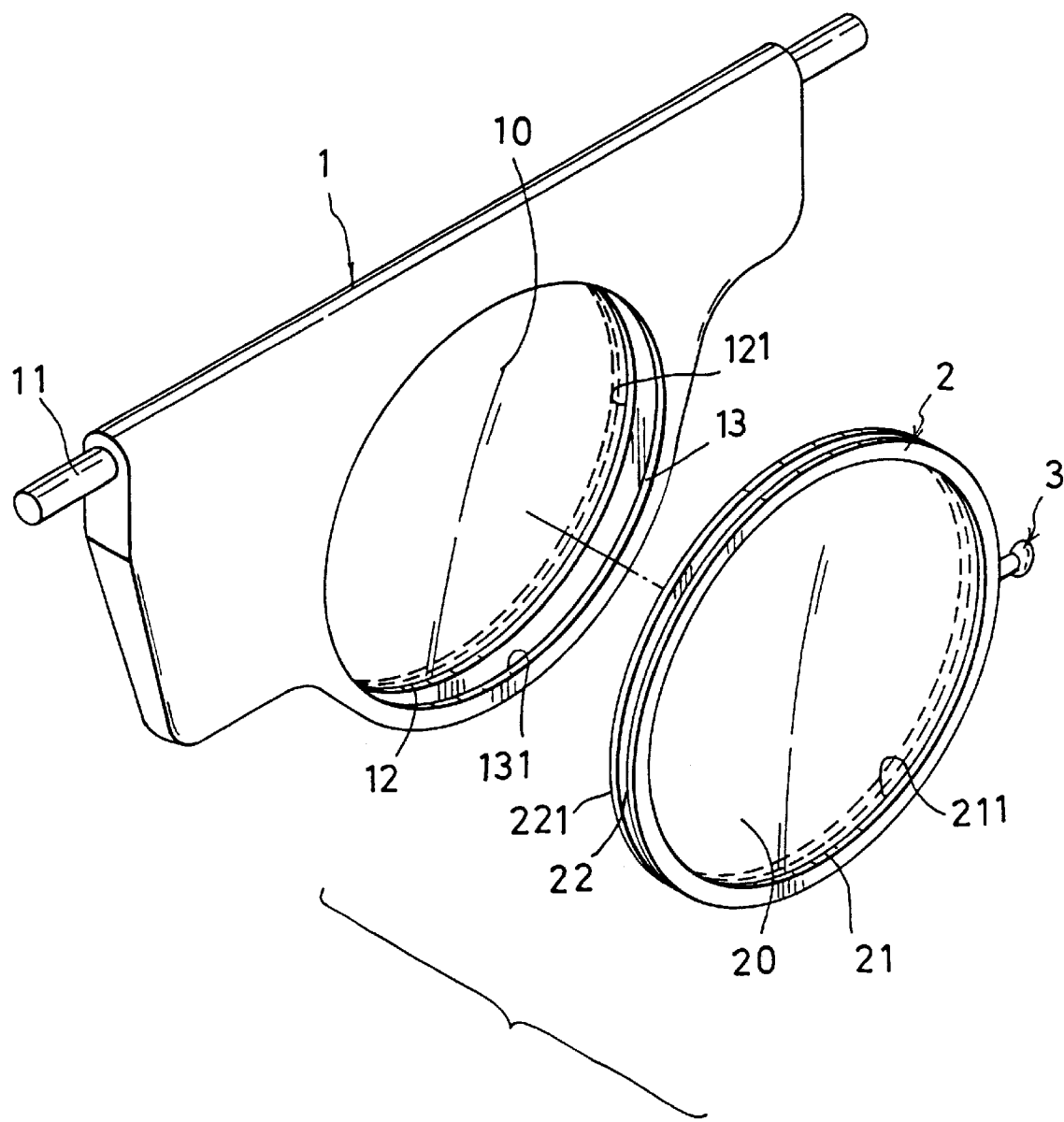
FIG. 1 is an exploded view of the present invention.
Figure 2:
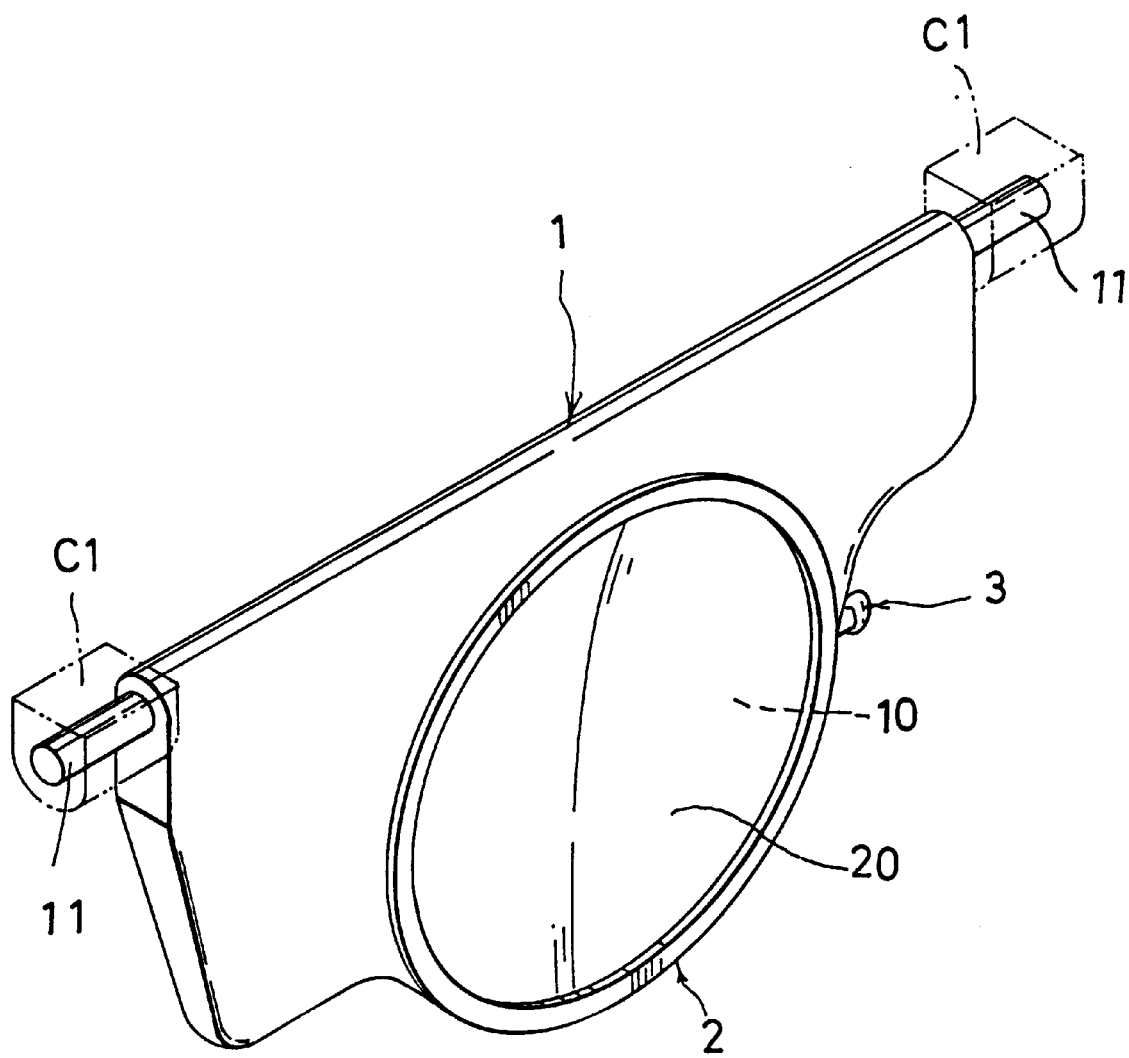
FIG. 2 is a perspective view of the present invention.
Figure 3:
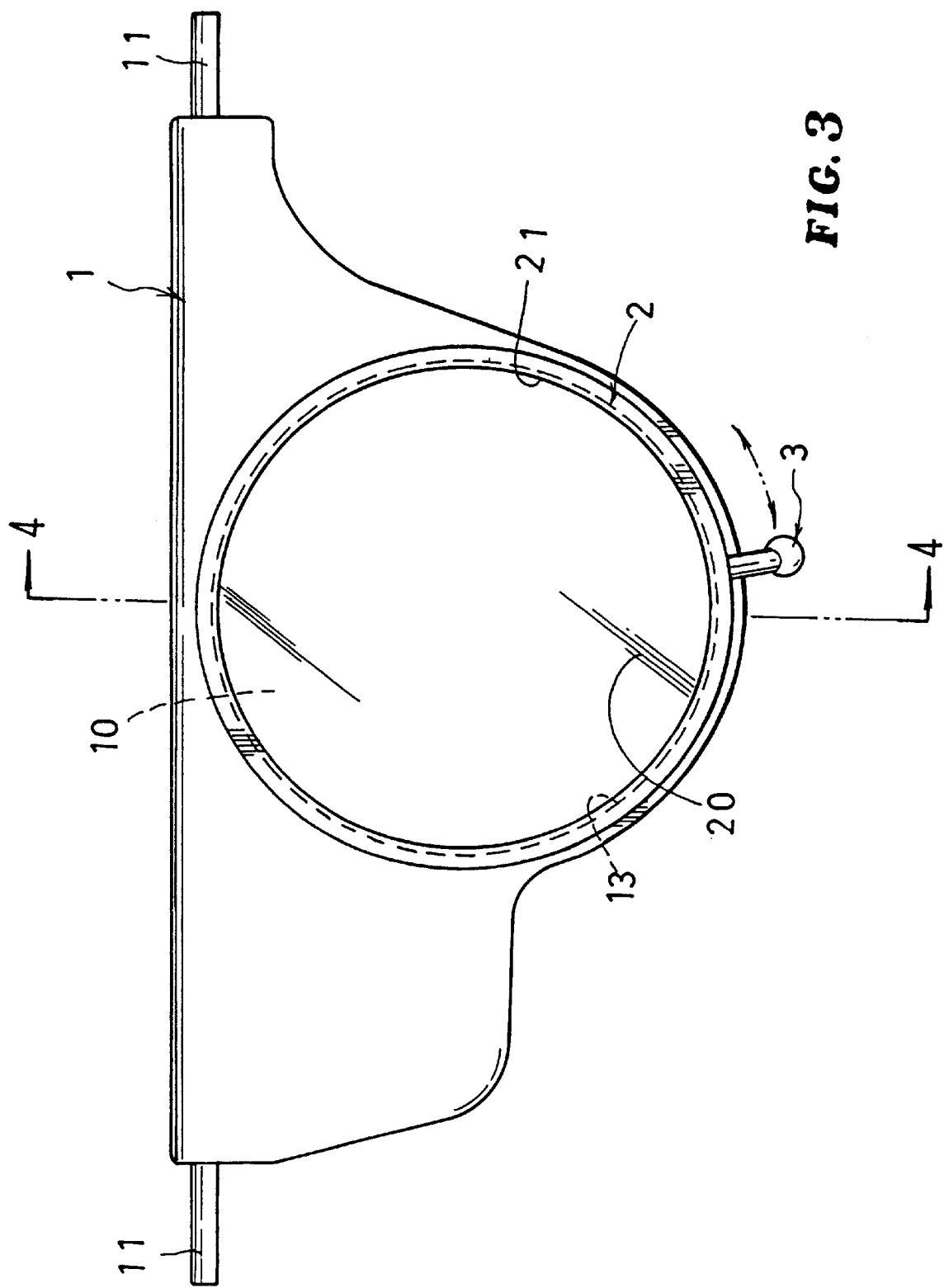
FIG. 3 is a front elevational view of the present invention.
Figure 4:
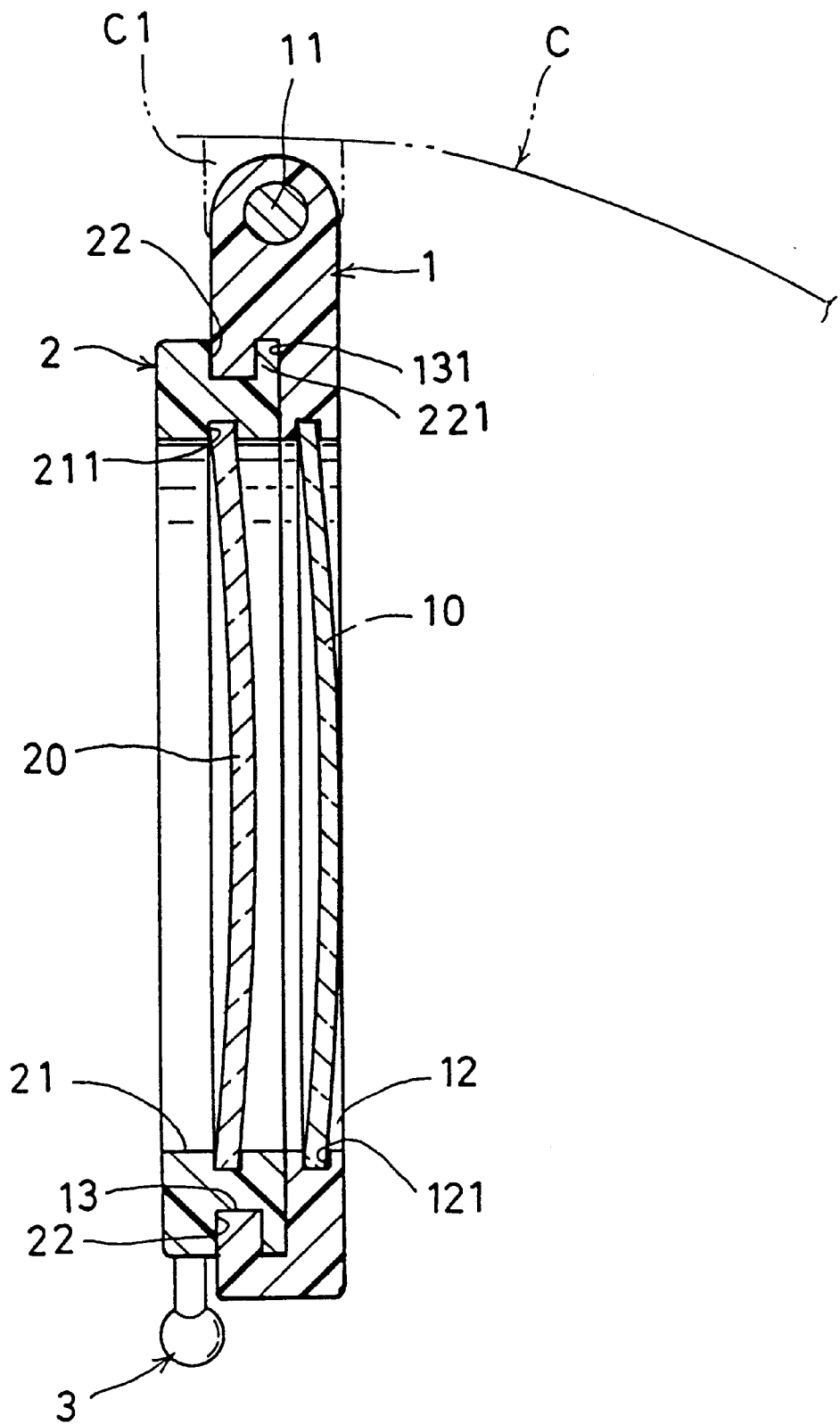
FIG. 4 is a sectional view taken along line 4—4 of FIG. 3.
Figure 5:
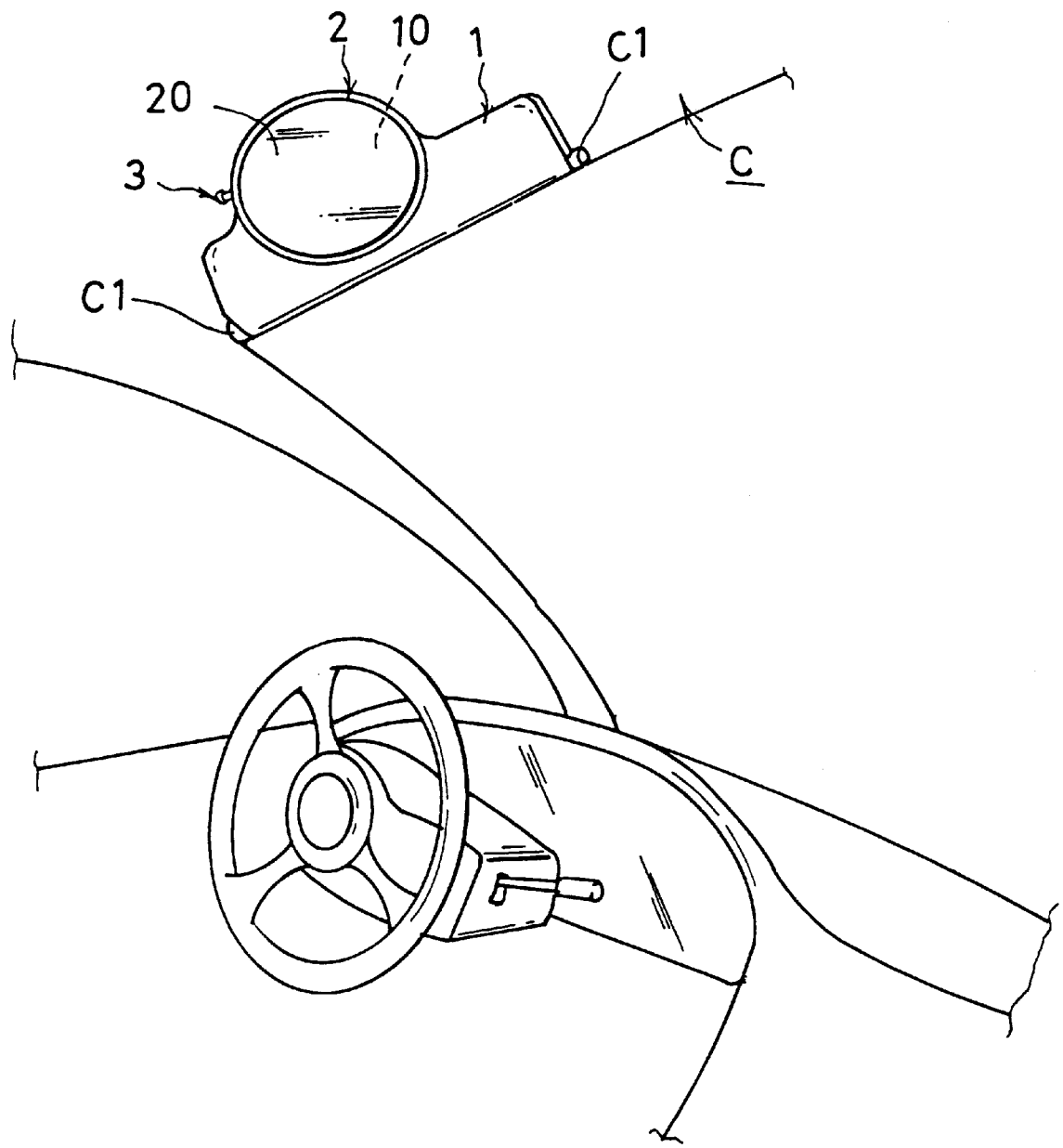
FIG. 5 is a working view of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 1, 2, 3, 4 and 5, the sun visor according to the present invention generally comprises a frame 1, an adjusting wheel 2, and a control means 3.

The frame 1 is provided with an axle 11 extending through the upper portion thereof and pivotally connected with two seats C1 of a vehicle C. The frame 1 has a first circular opening 12 formed with a circumferential groove 121 dimensioned to receive a lens 10 and a second circular opening 13 formed with a circumferential groove 131 adapted to receive the adjusting wheel 2. It should be noted, however, that the frame 1 may be a one-piece, injection molded member or comprised of several component parts.

The adjusting wheel 2 is an annular ring-like member having an opening 21 formed with a circumferential groove 211 dimensioned to receive a second lens 20. The outer side of the adjusting wheel 2 is formed with a circumferential groove 22 adapted to engage with the flange of the second circular opening 13 so that the adjusting wheel 2 can be rotated with respect to the frame 1.

The control means 3 is a protuberance extending outwardly from the outer edge of the adjusting wheel 2 to be held in the hand for turning the adjusting wheel 2 thereby varying the amount of light transmitted through the lenses 10 and 20.

The first lens 10 is a polarized lens for sunglasses while the second lens 20 is an ordinary polarized lens. As the first and second lenses 10 and 20 are relatively rotated over one another, the amount of light transmitted through the lenses 10 and 20 will be varied. The working principle is well known in the art and not considered a part of the present invention.

Figure 6:
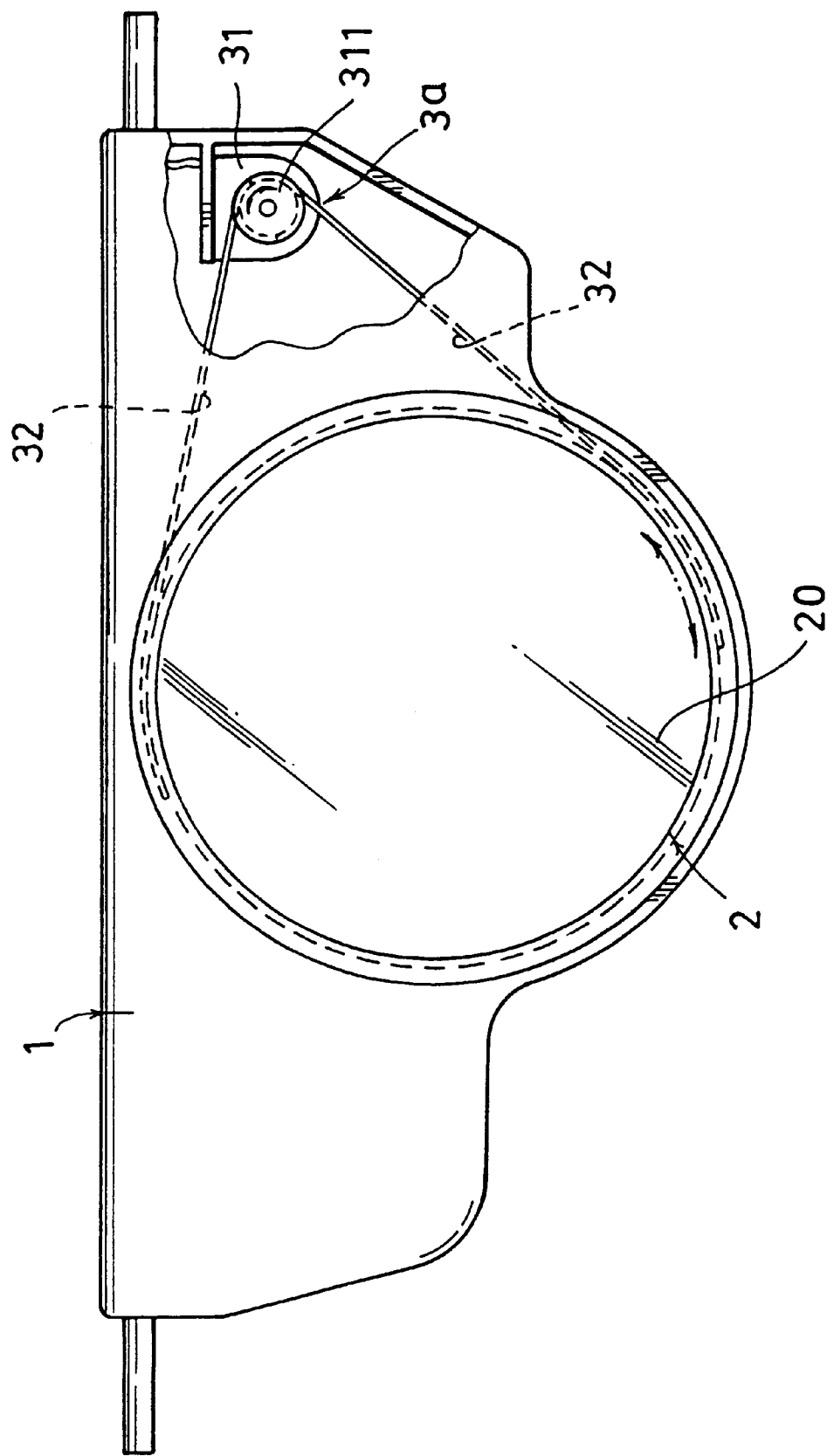
FIG. 6 illustrates a second preferred embodiment of the present invention.

FIG. 6 illustrates a second preferred embodiment of the present invention. As shown, the adjusting wheel 2 is driven by a control means 3a which includes an electrical motor 31 fixedly mounted on the frame 1, a pulley 311 pivotally mounted on an axle of the electrical motor 31, and a belt 32 connecting the adjusting wheel 2 and the pulley 311. When the electrical motor 31 is turned on, the pulley 311 will be rotated thereby rotating the adjusting wheel 2 via the belt 32. The circuit (not shown) for controlling the electrical motor 31 may be arranged on the dashboard (not shown) of a vehicle for facilitating the operation thereof.

Figure 7:
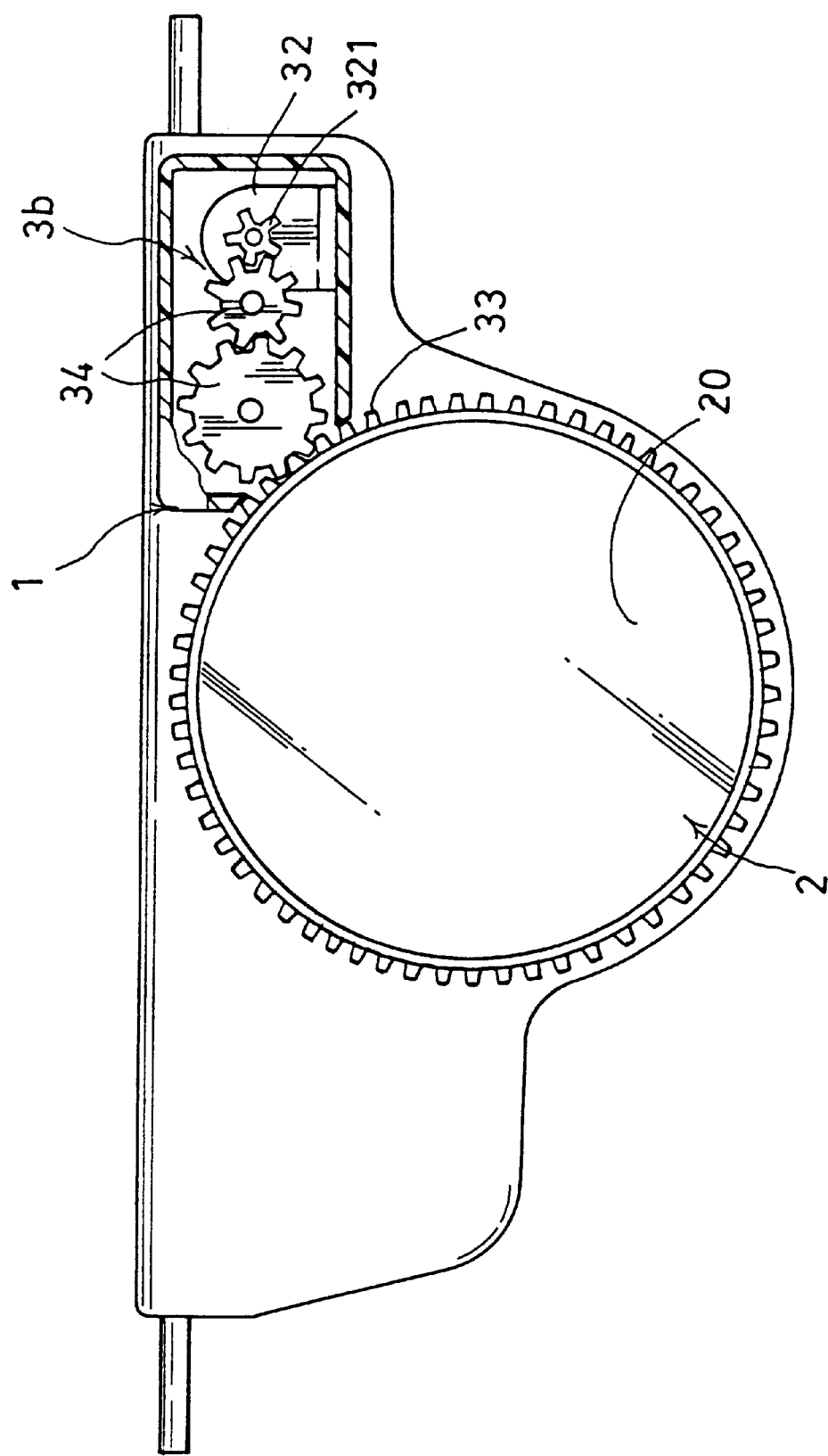
FIG. 7 illustrates a third preferred embodiment of the present invention.

FIG. 7 illustrates a third preferred embodiment of the present invention. As illustrated, the adjusting wheel 2 is driven by a control means 3b. The adjusting wheel 2 is formed with a plurality of teeth 33, while the control means 3b includes an electrical motor 32 fixedly mounted on the frame 1, a driving gear 321 fastened on the output axle of the electrical motor 32, and two idle gears 34 (or a compound train) arranged between the driving gear 321 and the adjusting wheel 2.

The lenses 10 and 20 are polarized lenses and the sun visor is arranged so that the lenses 10 and 20 may be disposed in front of the driver's eyes thereby increasing the shielding area and the adjusting wheel 2 can be rotated with respect to the frame 1 to adjust the amount of light transmitted through the lenses 10 and 20 as desired.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A sun vigor for automobiles comprising:
   a frame having a first circular opening and a second circular opening concentric with said first circular opening;
   a first lens fixedly mounted in said first circular opening;
   an adjust wheel rotatably fitted within said second circular opening;
   a second lens fixedly mounted in said adjust wheel; and
   means arranged on said adjust wheel for driving adjust wheel, said means including an electrical motor fixedly mounted on said frame, a pulley pivotally mounted on said frame, and a belt connecting said electrical motor to said pulley.

2. A sun visor for automobiles comprising:
   a forms having a first circular opening and a second circular opening concentric with said first circular opening;
   a first lens fixedly mounted in said first circular opening;
   an adjust wheel rotatably fitted within said second circular opening;
   a second lens fixedly mounted in said adjust wheel; and
   means arranged on said adjust wheel for driving adjust wheel, said means including an electrical motor having an output provided with a driving gear, said adjust wheel being provided with teeth meshed with said driving gear.

3. The sun visor for automobiles as claimed in claim 2, further comprising at least a medium gear engaged between said driving gear and said adjust wheel.

* * * * *